(12) United States Patent
Escobedo et al.

(10) Patent No.: US 8,360,197 B2
(45) Date of Patent: Jan. 29, 2013

(54) RECIRCULATING BALL POWER STEERING SYSTEM

(75) Inventors: Mauro Pacheco Escobedo, Troy, MI (US); Miroslaw Zaloga, Shelby Township, MI (US); Christopher J. Mielke, Shelby Township, MI (US); George E. Doerr, Clarkston, MI (US); Scott R. Kloess, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 40 days.

(21) Appl. No.: 13/069,654

(22) Filed: Mar. 23, 2011

(65) Prior Publication Data

US 2012/0241244 A1   Sep. 27, 2012

(51) Int. Cl.
*B62D 5/04* (2006.01)
(52) U.S. Cl. .......................... 180/444; 180/407
(58) Field of Classification Search .............. 180/444, 180/407, 405; 318/50
See application file for complete search history.

(56) References Cited

U.S. PATENT DOCUMENTS

| | | | |
|---|---|---|---|
| 4,686,433 A * | 8/1987 | Shimizu ........................ | 318/50 |
| 5,267,625 A * | 12/1993 | Shimizu ........................ | 180/443 |
| 5,327,986 A * | 7/1994 | Saita ............................. | 180/446 |
| 6,505,700 B2 * | 1/2003 | Furumi et al. ................ | 180/412 |
| 6,691,819 B2 * | 2/2004 | Menjak et al. ................ | 180/446 |
| 6,695,092 B2 * | 2/2004 | Cole ............................. | 180/444 |
| 6,705,424 B2 * | 3/2004 | Ogawa et al. ................ | 180/446 |
| 6,962,090 B2 * | 11/2005 | McDonald et al. .......... | 73/863.03 |
| 7,290,638 B2 * | 11/2007 | Shiino et al. ................. | 180/444 |

* cited by examiner

*Primary Examiner* — Tony Winner
(74) *Attorney, Agent, or Firm* — Quinn Law Group, PLLC (57) ABSTRACT

A power steering system includes an input shaft operatively connected to an input member, and a sector gear operatively connected to a pitman arm. A first ball screw is formed on the input shaft. A first ball nut circumscribes the first ball screw and is in torque-transfer communication therewith through a plurality of ball bearings. A first rack is rigidly attached to the first ball nut, and is meshed with the sector gear for torque transfer therewith. A second ball screw is not substantially coaxial with the first ball screw. A second ball nut circumscribes the second ball screw and is in torque-transfer communication with the second ball screw through the ball bearings. A second rack is meshed with the sector gear for torque transfer therewith. An electric motor is configured to selectively supply torque to the sector gear through the second ball screw.

18 Claims, 9 Drawing Sheets

RECIRCULATING BALL POWER STEERING SYSTEM

TECHNICAL FIELD

This disclosure relates to recirculating ball power steering systems for vehicles.

BACKGROUND

Vehicles use steering systems to communicate commanded changes, such as through a steering wheel, in direction or course from the driver to the steerable wheels of the vehicle, often the front wheels. Power steering systems assist the driver of the vehicle in steering by adding power to that supplied by the driver and reducing the effort needed to turn the steering wheel manually.

SUMMARY

A power steering system for transferring torque between an input member and a pitman arm is provided. The power steering system includes an input shaft operatively connected to the input member, and also includes a sector gear operatively connected to the pitman arm. A first ball screw is formed on the input shaft. A first ball nut circumscribes the first ball screw and is in torque-transfer communication with the first ball screw through a plurality of ball bearings. A first rack is rigidly attached to the first ball nut, and is meshed with the sector gear for torque transfer therewith.

The steering system further includes a second ball screw, which is not substantially coaxial with the first ball screw. A second ball nut circumscribes the second ball screw and is in torque-transfer communication with the second ball screw through the plurality of ball bearings. A second rack is meshed with the sector gear for torque transfer therewith. An electric motor is configured to selectively supply torque to the sector gear through the second ball screw.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
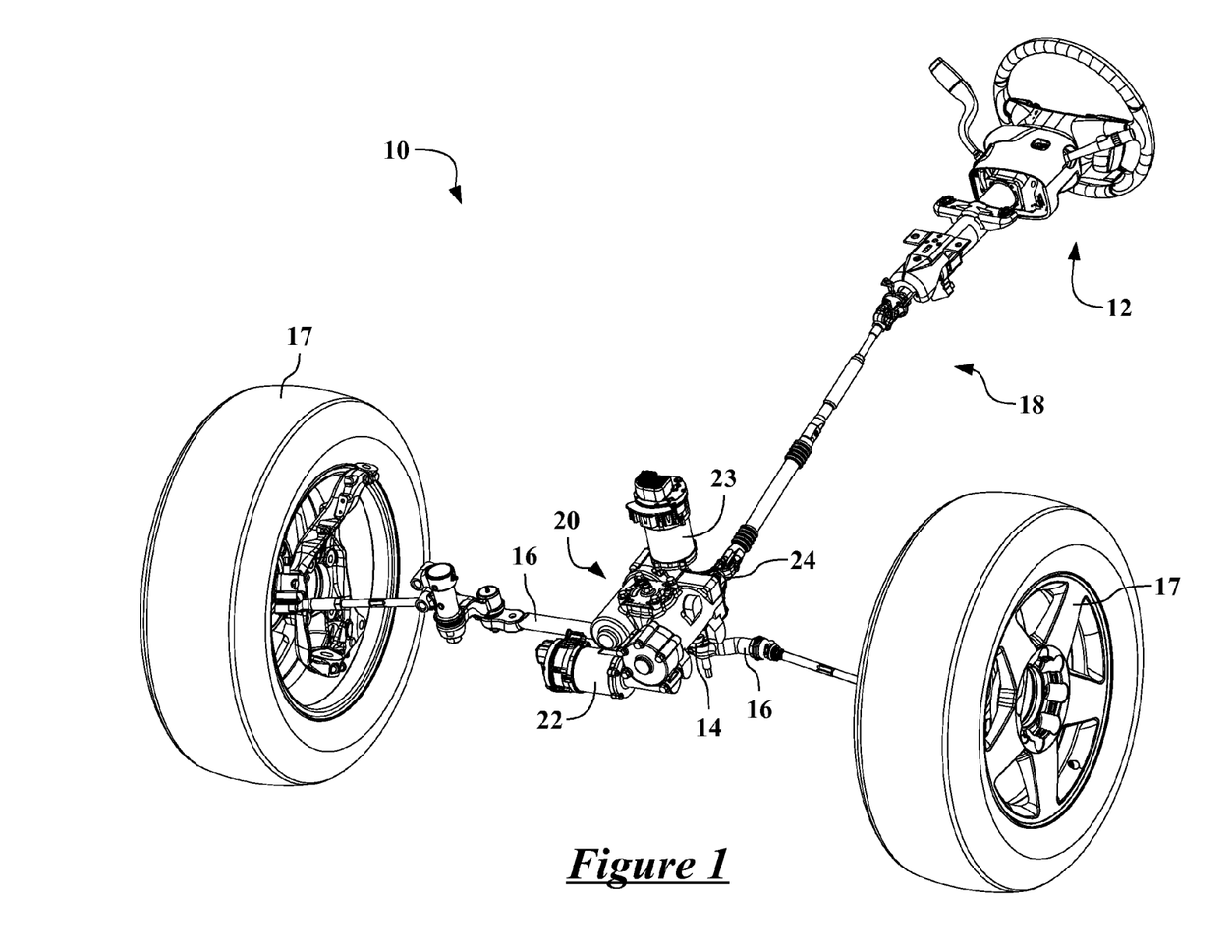
FIG. 1 is a schematic isometric view of a recirculating ball power steering system for a vehicle.

Referring to the drawings, wherein like reference numbers correspond to like or similar components whenever possible throughout the several figures, there is shown in FIG. 1 a schematic diagram of a recirculating ball power steering system 10 for a vehicle (the remainder of which is not shown). FIG. 1 shows some of the primary components of the steering system 10, which may be located toward the front of the vehicle. Features and components shown in other figures may be incorporated and used with those shown in FIG. 1.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The steering system 10 transfers rotation and torque from an input member, such as a steering wheel 12, to an output member, such as a pitman arm 14 (partially blocked from view), which moves a relay rod 16. One or more wheels 17 of the vehicle are turned through movement of the relay rod 16 and attached components (not separately number, but including tie rods, steering knuckles, et cetera). A steering column 18 is attached to the steering wheel 12, and includes various linkages, sensors, switches, and accessories. The steering wheel 12 shown is illustrative only and other types of steering devices may be used with the steering system 10. A recirculating ball mechanism 20, examples of which will be described in more detail herein, transfers torque from the steering wheel 12 to the pitman arm 14.

In the steering system 10 shown in FIG. 1, the steering wheel 12 acts as the input member. Input signals—in the form of torque and rotational movement—are input to the steering wheel 12 by the operator or driver of the vehicle. The front wheels of the vehicle are the output members in the steering system 10 shown in FIG. 1. Therefore, the recirculating ball mechanism 20 is an intermediary between the input from the steering wheel 12 and the output to the pitman arm 14 and the wheels 17. Other input and output members may be used with the steering system 10 and the recirculating ball mechanism 20. For example, and without limitation, the recirculating ball mechanism 20 may receive input signals from a drive-by-wire system that is not directly linked to the steering wheel 12, in which case the input member may be a solenoid or small electric machine and the steering column 18 may be removed or shortened. Furthermore, the pitman arm 14 and relay rods 16 may be linked to rear wheels (not shown) of the vehicle.

In order to selectively increase the torque transferred from the steering wheel 12 by the vehicle operator, the steering system 10 also includes one or more electric machines, such as a first electric motor 22 and a second electric motor 23. The recirculating ball mechanism 20 also transfers torque and power from the first electric motor 22 and the second electric motor 23 to the pitman arm 14. Therefore, the recirculating ball mechanism combines torque from the steering wheel 12, the first electric motor 22, and the second electric motor 23 to move the pitman arm 14 and the relay rod 16. Torque and rotation of the steering wheel 12 are transferred to an input shaft 24 (partially blocked from view) of the recirculating ball mechanism 20.

The steering system 10 is characterized by the lack of a boost mechanism on the steering column 18 disposed between the steering wheel 12 and the input shaft 24, such that the steering system 10 does not include column assist. Furthermore, the recirculating ball mechanism 20 does not include a hydraulic boost or hydraulic assist. The amount of torque and power supplied by the first electric motor 22 and the second electric motor 23 may be varied based upon driving conditions of the vehicle.

The steering system 10 may include a controller or control system (not shown). The control system may include one or more components with a storage medium and a suitable amount of programmable memory, which are capable of storing and executing one or more algorithms or methods to effect control of the steering system 10 and, possibly, other components of the vehicle. The control system is in communication with, at least, the first electric motor 22, the second electric motor 23, and the input shaft 24 or sensors associated therewith. The control system may be in communication with numerous sensors and communication systems of the vehicle. Each component of the control system may include distributed controller architecture, such as a microprocessor-based electronic control unit (ECU). Additional modules or processors may be present within the control system.

Figure 2:
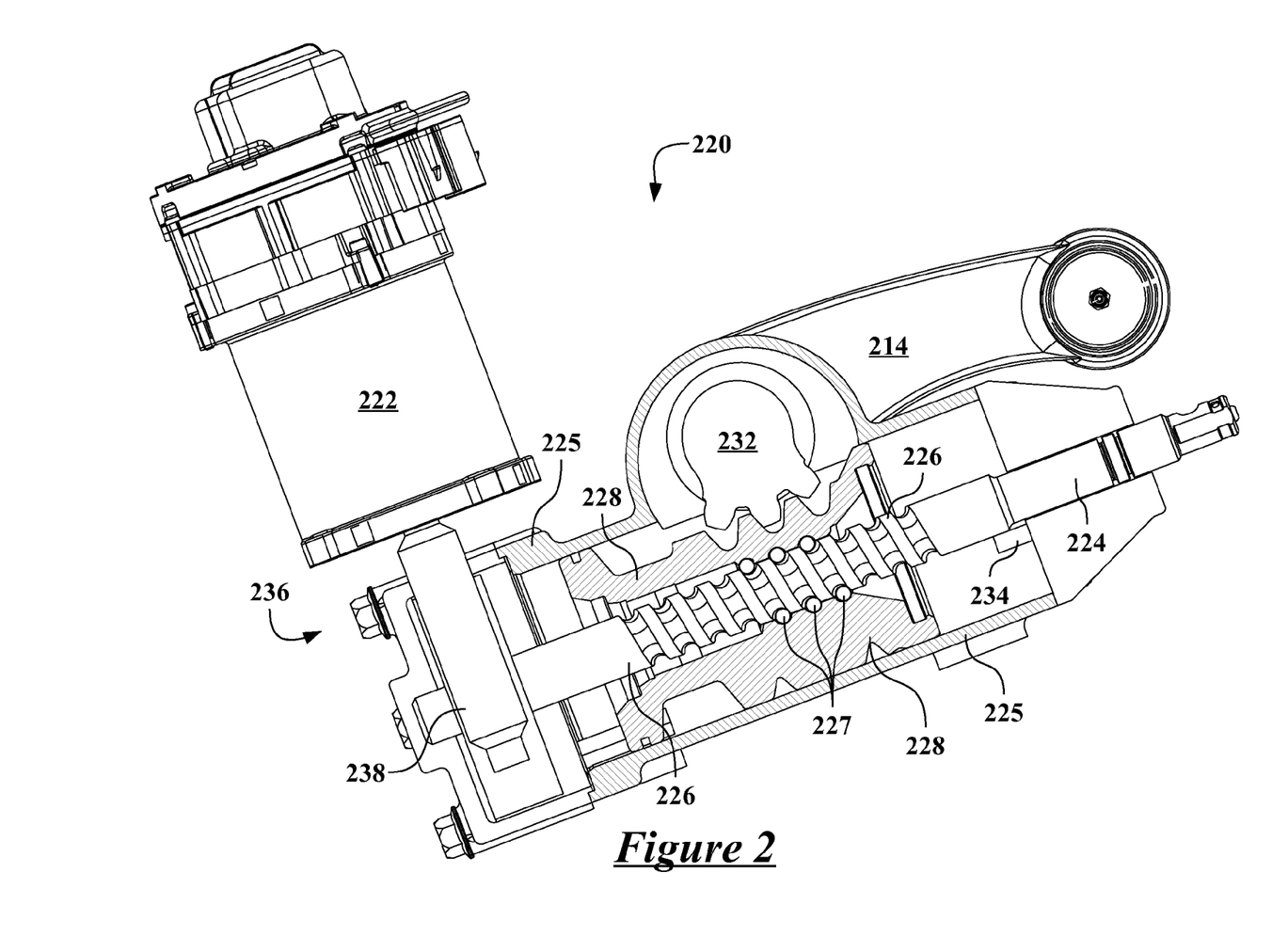
FIG. 2 is a schematic, partial cross-sectional, top view of a recirculating ball mechanism usable with power steering systems, such as the system in FIG. 1, showing an electric motor mounted on the forward side of the recirculating ball mechanism.

Referring now to FIG. 2, and with continued reference to FIG. 1, there is shown a recirculating ball mechanism 220 usable with power steering systems, such as the steering system 10 shown in FIG. 1. FIG. 2 generally shows a top view of the recirculating ball mechanism 220. Features and components shown in other figures may be incorporated and used with those shown in FIG. 2.

The recirculating ball mechanism 220 combines torque from a steering wheel (not shown) or another input member and an electric motor 222 and transfers torque to and from a pitman arm 214. An input shaft 224 is operatively connected to the steering wheel, such as through a steering column and linkage (not shown) and is carried within a housing 225. The input shaft 224 may be connected to other input members. Portions of the housing 225 have either been removed or cross-sectioned to better illustrate the workings of the recirculating ball mechanism 220. The housing 225 (and the other housing configurations shown) is illustrative only and may take different forms from that shown in the figures.

The input shaft 224 has a first ball screw 226 formed on one end. The first ball screw 226 shown is formed as an integral, one-piece member with the input shaft 224. The housing 225 may be formed in more than one piece and include various seals and bearings to facilitate movement of the components of the recirculating ball mechanism 220.

A first ball nut 228 circumscribes the first ball screw 226 and is in torque-transfer communication with the first ball screw 226 through a plurality of ball bearings 227, shown schematically, which circulate between the first ball screw 226 and the first ball nut 228. The housing 225 surrounds the first ball nut 228 and guides movement thereof, such that the first ball nut 228 slides but does not rotate within the housing 225. Rotation of the steering wheel causes the input shaft 224 and the first ball screw 226 to rotate. As the first ball screw 226 rotates, the rotation is transferred to the first ball nut 228 and causes linear (left and right, as viewed in FIG. 2) movement of the first ball nut 228.

The first ball nut 228 is meshed with a sector gear 232 for torque transfer therewith. The sector gear 232 is rigidly attached, such as through a splined connection, to the pitman arm 214, and may be carried or supported by the housing 225 or other structure. Therefore, linear movement of the first ball nut 228 causes rotation of the sector gear 232, such that movement of the steering wheel results in movement of the sector gear 232 and the pitman arm 214.

The recirculating ball mechanism 220 includes one or more sensors 234 configured to determine torque and angular orientation at the input shaft 224. The sensors 234 monitor the torque and displacement of the input shaft 224 from the operator inputs to the steering wheel, and also monitor the reactive torque transferred to the input shaft 224 by the vehicle wheels. The sensors 234 are shown only schematically and may include multiple sensors of different types. Furthermore, the sensors 234 may be in communication with one or more control systems (not shown) to process signals or commands from the sensor 234.

The electric motor 222 is configured to selectively supply torque to the sector gear 232 through the recirculating ball mechanism 220. The amount of torque delivered by the electric motor 222 may be variably delivered based upon, in part, the signals from the sensors 234, the control system, or other components and sensors. Furthermore, the electric motor 222 may be controlled for use with other vehicle systems, including, but not limited to: electronic stability control, parking assist, and lane-departure. In rear-wheel steering or drive-by-wire configurations, the sensors 234 may directly monitor the steering wheel, which may not be mechanically linked to the input shaft 224.

A drive unit 236 is disposed between the electric motor 222 and the first ball nut 228, and enables torque transfer between the electric motor 222 and the sector gear 232. Portions of the drive unit 236 have been removed or cross-sectioned to better illustrate the workings of the drive unit 236. In the configuration shown in FIG. 2, the drive unit 236 is driven by a worm gear 238. The drive unit 236 is directly connected to, and acts on, the first ball screw 226 on the end of the housing 225 opposite from the input shaft 224—the forward side, relative to the forward direction of travel for the vehicle. The first ball screw 226 then transfers torque to the first ball nut 228. Therefore, the electric motor 222 boosts the torque and power delivered to the sector gear 232 and the vehicle wheels.

Other configurations of the drive unit 236, some of which are discussed herein, may be used with the recirculating ball mechanism 220. For example, and without limitation, the drive unit 236 may be driven by a chain or belt instead of the worm gear 238, or the drive unit 236 may include other gears, sprockets, et cetera. Furthermore, the location of the connection from the drive unit 236 may vary, as long as the linkage between the electric motor 222 and the sector gear 232 is maintained for sufficient torque transfer and steering assistance.

Alternatively, the recirculating ball mechanism 220 may be utilized with rear-wheel steering systems. In such a configuration, the recirculating ball mechanism 220 may not include the input shaft 224 and the input signals would come from the control system, which may be monitoring the steering wheel and converting driver commands into torque needed to turn the rear wheels (not shown). In rear-wheel applications, the recirculating ball mechanism 220 may use the electric motor 222 as the sole source of torque for turning the rear wheels.

Figure 3:
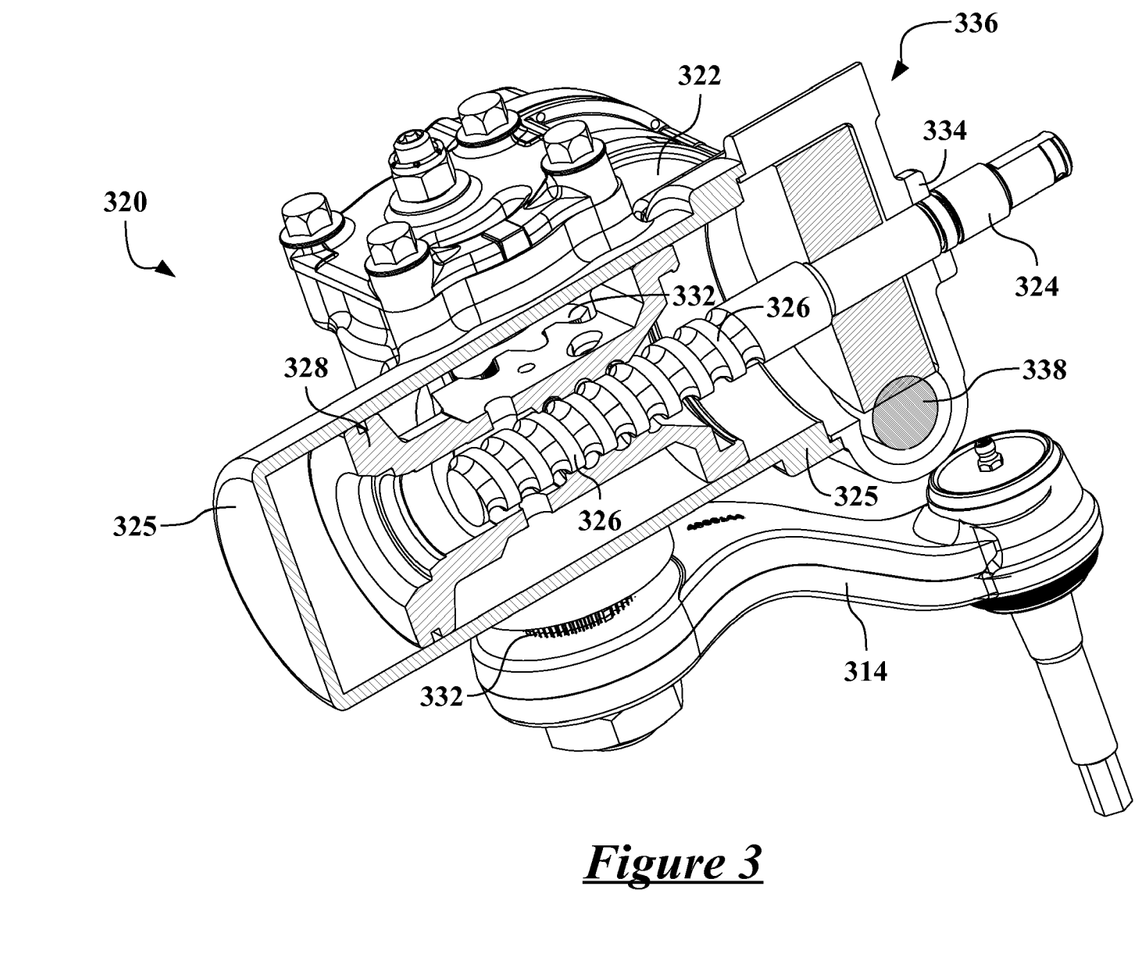
FIG. 3 is a schematic, isometric, partial cross-sectional view of an electric recirculating ball mechanism usable with power steering systems, such as the system in FIG. 1, showing an electric motor mounted on the rearward, or input-shaft, side of the recirculating ball mechanism.

Referring now to FIG. 3, and with continued reference to FIGS. 1 and 2, there is shown a recirculating ball mechanism 320 usable with power steering systems, such as the steering system 10 shown in FIG. 1. FIG. 3 generally shows a side view of the recirculating ball mechanism 320, which is similar to the recirculating ball mechanism 220 shown in FIG. 2. Features and components shown in other figures may be incorporated and used with those shown in FIG. 3.

The recirculating ball mechanism 320 combines torque from a steering wheel (not shown) or another input member and an electric motor 322 and transfers torque to and from a pitman arm 314. An input shaft 324 is operatively connected to the steering wheel and is carried within a housing 325. Portions of the housing 325 have been removed or cross-sectioned to better illustrate the workings of the recirculating ball mechanism 320. The input shaft 324 has a first ball screw 326 formed on one end. The first ball screw 326 shown is formed as an integral, one-piece member with the input shaft 324.

A first ball nut 328 circumscribes the first ball screw 326 and is in torque-transfer communication with the first ball screw 326 through a plurality of ball bearings (not shown), which circulate between the first ball screw 326 and the first ball nut 328. The housing 325 surrounds the first ball nut 328 and guides movement thereof. Rotation of the steering wheel causes the input shaft 324 and the first ball screw 326 to rotate. As the first ball screw 326 rotates, the rotation is transferred to the first ball nut 328 and causes linear movement (generally left and right, as viewed in FIG. 3) of the first ball nut 328.

The first ball nut 328 is meshed with and engages a sector gear 332 (largely hidden from view) for torque transfer therewith. The sector gear 332 is rigidly attached, such as through a splined connection, to the pitman arm 314. Therefore, linear movement of the first ball nut 328 causes rotation of the sector gear 332, such that movement of the steering wheel results in movement of the sector gear 332 and the pitman arm 314.

The recirculating ball mechanism 320 includes one or more sensors 334 configured to determine torque and angular orientation at the input shaft 324 or the first ball screw 226. The sensors 334 monitor the torque and displacement of the input shaft 324 communicated from the operator inputs to the steering wheel, and also monitor the reactive torque transferred back to the input shaft 324 by the vehicle wheels. The sensors 334 may include multiple sensors of different types and may be in communication with a control system (not shown) to process signals or commands from the sensor 334.

The electric motor 322 is configured to selectively supply torque to the sector gear 332 through the recirculating ball mechanism 320. The amount of torque delivered by the electric motor 322 may be based, in part, upon the signals from the sensors 334, the control system, or other components and sensors.

A drive unit 336 is disposed between the electric motor 322 and the first ball nut 328, and enables torque transfer between the electric motor 322 and the sector gear 332. Portions of the drive unit 336 have been removed or cross-sectioned to better illustrate the workings of the drive unit 336. In the configuration shown in FIG. 3, the drive unit 336 is driven by a worm gear 338, and is directly connected to, and acts on, the first ball screw 326.

The drive unit 336 of FIG. 3 acts on the end of the housing 325 adjacent to the input shaft 324, allowing the electric motor 322 and the drive unit 336 to be placed on the steering wheel side of the recirculating ball mechanism. The connections between the drive unit 336 and the first ball screw 326 are shown schematically, and individual gear teeth are not illustrated. The first ball screw 326 then transfers torque to the first ball nut 328. Therefore, the electric motor 322 boosts the torque and power delivered to the sector gear 332 and the vehicle wheels.

Figure 4:
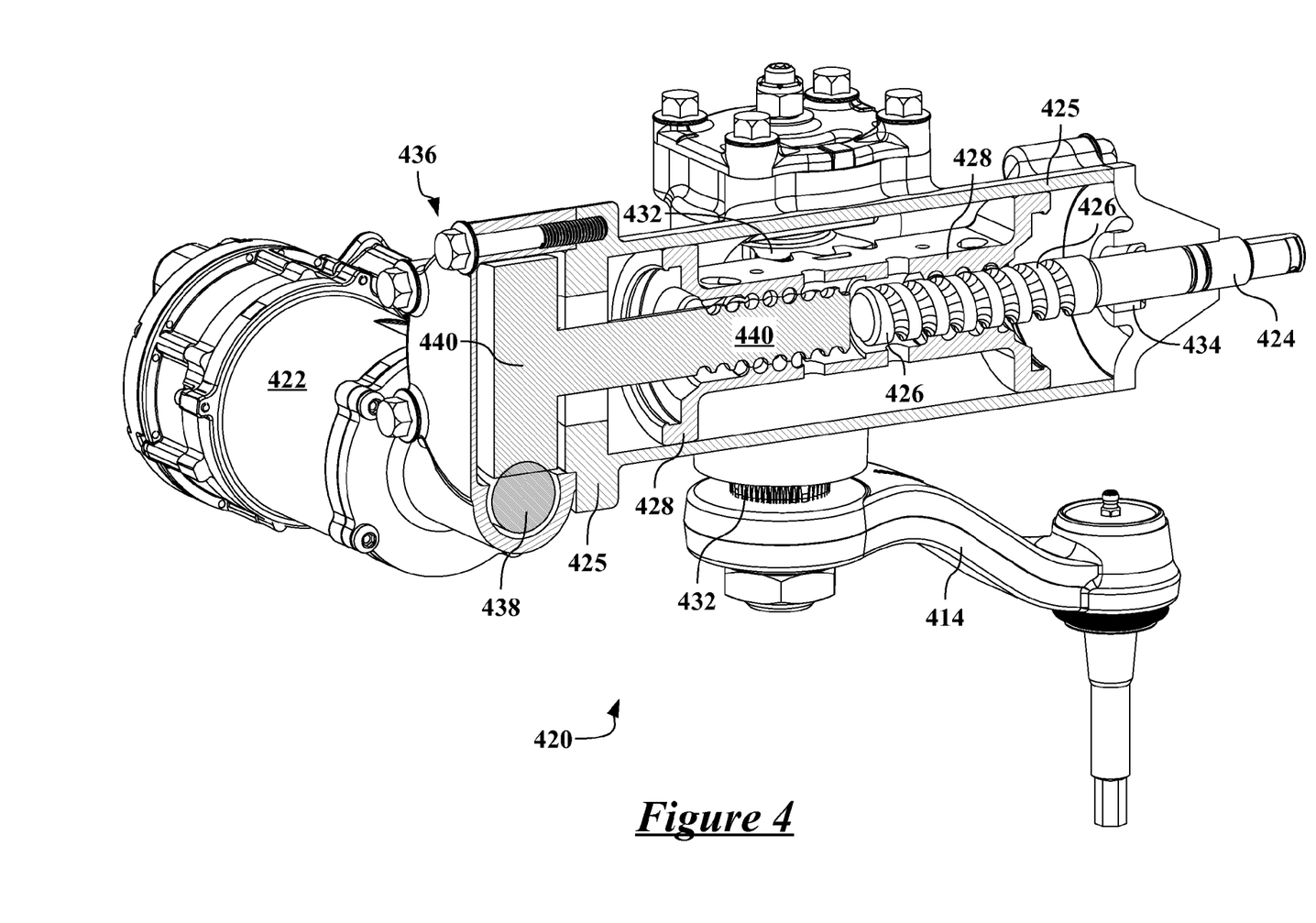
FIG. 4 is a schematic, isometric, partial cross-sectional view of a recirculating ball mechanism usable with power steering systems, such as the system in FIG. 1, showing power transfer to the recirculating ball mechanism through a second ball screw.

Referring now to FIG. 4, and with continued reference to FIGS. 1-3, there is shown a recirculating ball mechanism 420 usable with power steering systems, such as the steering system 10 shown in FIG. 1. FIG. 4 generally shows a side view of the recirculating ball mechanism 420. Features and components shown in other figures may be incorporated and used with those shown in FIG. 4.

The recirculating ball mechanism 420 combines torque from a steering wheel (not shown) or another input member and an electric motor 422 and transfers torque to and from a pitman arm 414. An input shaft 424 is operatively connected to the steering wheel and is carried within a housing 425. A cross-section plane has been taken through the housing 425 to better illustrate the workings of the recirculating ball mechanism 420. The input shaft 424 has a first ball screw 426 formed on one end. The first ball screw 426 shown is formed as an integral, one-piece member with the input shaft 424.

A first ball nut 428 circumscribes the first ball screw 426 and is in torque-transfer communication with the first ball screw 426 through a plurality of ball bearings (not shown), which circulate between the first ball screw 426 and the first ball nut 428. The housing 425 surrounds the first ball nut 428 and guides movement thereof. Rotation of the steering wheel causes the input shaft 424 and the first ball screw 426 to rotate. As the first ball screw 426 rotates, the rotation is transferred to the first ball nut 428 and causes linear movement (generally left and right, as viewed in FIG. 4) of the first ball nut 428.

The first ball nut 428 is meshed with a sector gear 432 (largely hidden from view) for torque transfer therewith. The sector gear 432 is rigidly attached, such as through a splined connection, to the pitman arm 414. Therefore, linear movement of the first ball nut 428 causes rotation of the sector gear 432, such that movement of the steering wheel results in movement of the sector gear 432 and the pitman arm 414.

The recirculating ball mechanism 420 includes one or more sensors 434 configured to determine torque and angular orientation at the input shaft 424 or the first ball screw 226. The sensors 434 monitor the torque and displacement of the input shaft 424 communicated from the operator inputs to the steering wheel, and also monitor the reactive torque transferred back to the input shaft 424 by the vehicle wheels. The sensors 434 may include multiple sensors of different types and may be in communication with a control system (not shown) to process signals or commands from the sensors 434.

The electric motor 422 is configured to selectively supply torque to the sector gear 432 through the recirculating ball mechanism 420. The amount of torque delivered by the electric motor 422 may be based, in part, upon the signals from the sensors 434, the control system, or other components and sensors.

A drive unit 436 is disposed between the electric motor 422 and the first ball nut 428, and enables torque transfer between the electric motor 422 and the sector gear 432. Portions of the drive unit 436 have also been cross-sectioned to better illustrate the workings of the drive unit 436.

The recirculating ball mechanism 420 further includes a second ball screw 440, which is substantially coaxial with the first ball screw 426. The second ball screw 440 is also in torque-transfer communication with the first ball nut 428 through the plurality of ball bearings. Therefore, torque may be transferred to the first ball nut 428 from either or both of the first ball screw 426 and the second ball screw 440.

In the configuration shown in FIG. 4, the drive unit 426 is driven by a worm gear 438, and is directly connected to, and acts on, the second ball screw 440 through a gear attached thereto. In the configuration shown in FIG. 4, the drive unit 436 acts on the end of the housing 425 opposite from the input shaft 424. The connections between the drive unit 436 and the second ball screw 440 are shown schematically, and individual gear teeth are not illustrated. The second ball screw 440 and the first ball screw 426 then transfer combined torque to the first ball nut 428. Therefore, the electric motor 422 boosts the torque and power delivered to the sector gear 432 and the vehicle wheels.

Figure 5:
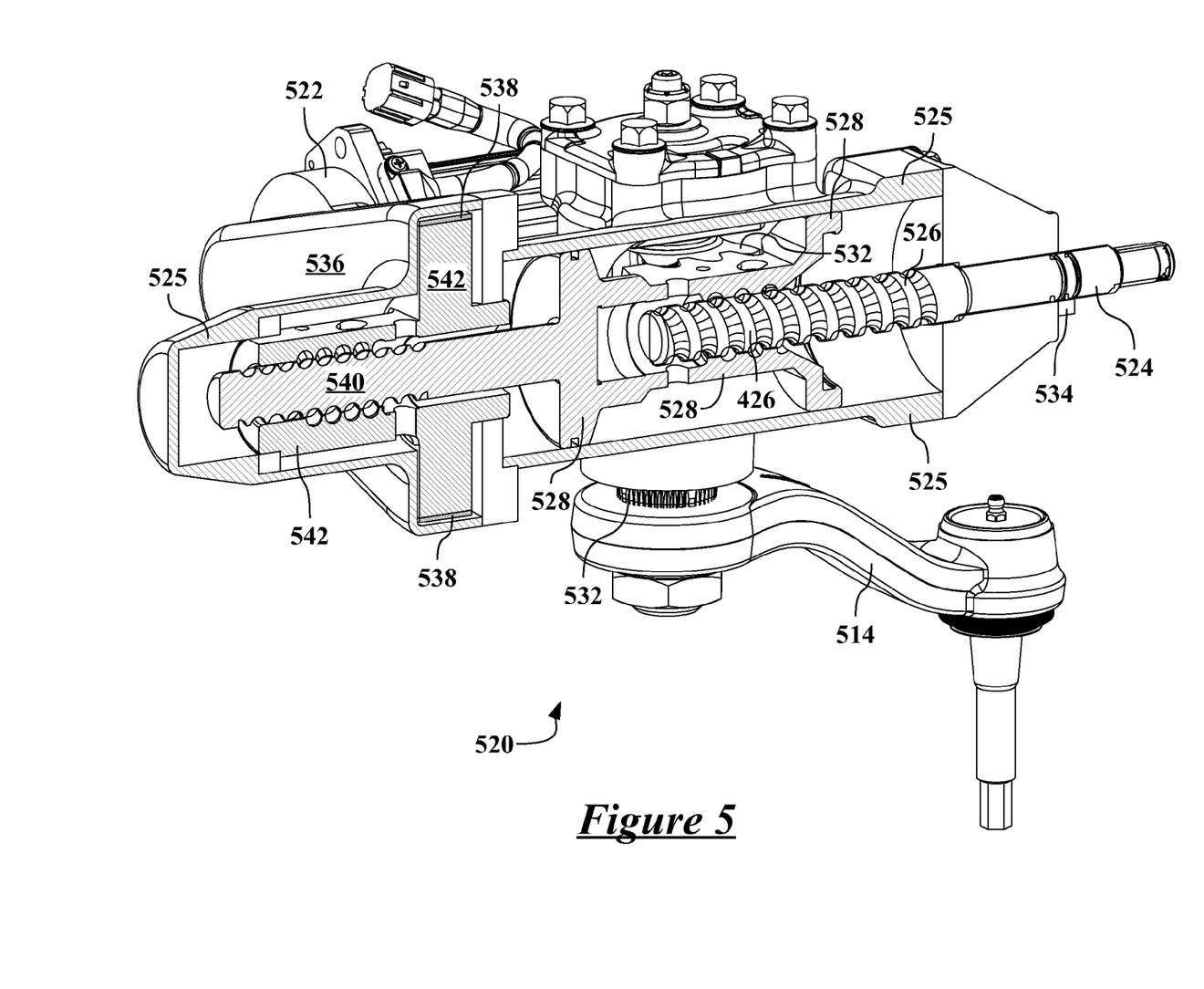
FIG. 5 is a schematic, isometric, partial cross-sectional view of a recirculating ball mechanism usable with power steering systems, such as the system in FIG. 1, showing power transfer to the recirculating ball mechanism through a second ball nut.

Referring now to FIG. 5, and with continued reference to FIGS. 1-4, there is shown a recirculating ball mechanism 520 usable with power steering systems, such as the steering system 10 shown in FIG. 1. FIG. 5 generally shows a side view of the recirculating ball mechanism 520. Features and components shown in other figures may be incorporated and used with those shown in FIG. 5.

The recirculating ball mechanism 520 combines torque from a steering wheel (not shown) or another input member and an electric motor 522 and transfers torque to and from a pitman arm 514. Much of the electric motor 522 is hidden from view in FIG. 5. An input shaft 524 is operatively connected to the steering wheel and is carried within a housing 525. A cross-section plane has been taken through the housing 525 to better illustrate the workings of the recirculating ball mechanism 520.

The input shaft 524 has a first ball screw 526 formed on one end. The first ball screw 526 shown is formed as an integral, one-piece member with the input shaft 524. The housing 525 may be formed in more than one piece and may include various seals and bearings to facilitate movement of the components of the recirculating ball mechanism 520.

A first ball nut 528 circumscribes the first ball screw 526 and is in torque-transfer communication with the first ball screw 526 through a plurality of ball bearings (not shown), which circulate between the first ball screw 526 and the first ball nut 528. The housing 525 surrounds the first ball nut 528 and guides movement thereof.

Rotation of the steering wheel causes the input shaft 524 and the first ball screw 526 to rotate. As the first ball screw 526 rotates, the rotation is transferred to the first ball nut 528 and causes linear movement (generally left and right, as viewed in FIG. 5) of the first ball nut 528.

The first ball nut 528 is meshed with and engages a sector gear 532 (largely hidden from view) for torque transfer therewith. The sector gear 532 is rigidly attached, such as through a splined connection, to the pitman arm 514. Therefore, linear movement of the first ball nut 528 causes rotation of the sector gear 532, such that movement of the steering wheel results in movement of the sector gear 532 and the pitman arm 514. The housing 525 and the sector gear 532 prevent rotation of the first ball nut 528, such that it may translate but may not rotate.

The recirculating ball mechanism 520 includes one or more sensors 534 configured to determine torque and angular orientation at the input shaft 524 or the first ball screw 226. The sensors 534 monitor the torque and displacement of the input shaft 524 communicated from the operator inputs to the steering wheel, and also monitor the reactive torque transferred back to the input shaft 524 by the vehicle wheels. The sensors 534 may include multiple sensors of different types and may be in communication with a control system (not shown) to process signals or commands from the sensors 534.

The electric motor 522 is configured to selectively supply torque to the sector gear 532 through the recirculating ball mechanism 520. The amount of torque delivered by the electric motor 522 may be based, in part, upon the signals from the sensors 534, the control system, or other components and sensors.

A drive unit 536 is disposed between the electric motor 522 and the first ball nut 528, and enables torque transfer between the electric motor 522 and the sector gear 532. Portions of the drive unit 536 have also been cross-sectioned to better illustrate the workings of the drive unit 536.

The recirculating ball mechanism 520 further includes a second ball screw 540, which is substantially coaxial with the first ball screw 526. The second ball screw 540 is formed integrally, as one-piece, with the first ball nut 528. Therefore, the first ball nut 528 and the second ball screw 540 move in conjunction. Unlike the second ball screw 440 shown in FIG. 4, the second ball screw 540 shown in FIG. 5 only slides and does not rotate.

The recirculating ball mechanism 520 also includes a second ball nut 542 that circumscribes the second ball screw 540 and is in torque-transfer communication with the second ball screw 540 through the plurality of ball bearings, which circulate between the second ball screw 540 and the second ball nut 542. The recirculating ball mechanism 520 may include two separate sets of ball bearings within the plurality of ball bearings. The housing 525 also surrounds the second ball nut 540 and guides movement thereof. Unlike the first ball nut 528, the second ball nut 542 rotates, but does not translate within the housing 525.

In the configuration shown in FIG. 5, the drive unit 536 is driven by a chain or a belt 538, and is directly connected to, and acts on, the second ball nut 542 through a reduction gear or flange attached thereto. In the configuration shown in FIG. 5, the drive unit 536 acts on the end of the housing 525 opposite from the input shaft 524. The connections between the drive unit 536 and the second ball nut 542 are shown schematically. The second ball nut 542 transfers torque from the electric motor 522 to the second ball screw 540, which is attached to the first ball nut 528.

The combined torque from the electric motor through the second ball nut 542 and from the steering wheel through the first ball screw 526 is transferred to the first ball nut 528. Therefore, the electric motor 522 boosts the torque and power delivered to the sector gear 532 and the vehicle wheels.

The recirculating ball mechanisms described herein and shown in the figures may also be used with rear-wheel steering systems in drive-by-wire configurations. In such a configuration, the recirculating ball mechanisms may convert input signals from the steering wheel into torque commands for one or more electric motors, which will then control movement of the rear wheels.

Figure 6:
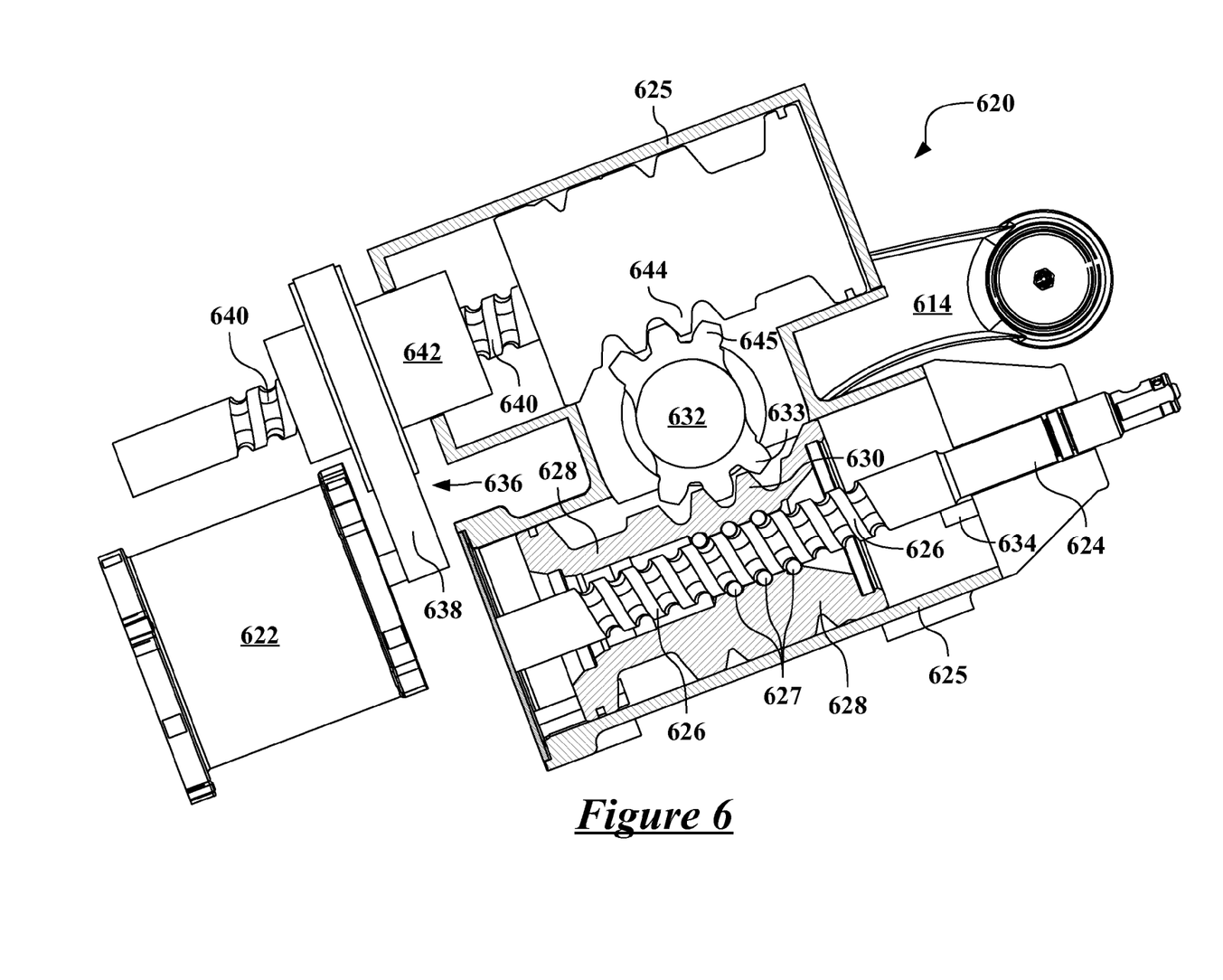
FIG. 6 is a schematic, partial cross-sectional, top view of a recirculating ball mechanism usable with power steering systems, such as the system in FIG. 1, showing a dual-bore recirculating ball mechanism.

Referring now to FIG. 6, and with continued reference to FIGS. 1-5, there is shown a recirculating ball mechanism 620 usable with power steering systems, including the steering system 10 shown in FIG. 1 and other steering systems. FIG. 6 generally shows a top view of the recirculating ball mechanism 620. Features and components shown in other figures may be incorporated and used with those shown in FIG. 6.

The recirculating ball mechanism 620 combines torque from a steering wheel (not shown) or another input member and an electric motor 622 and transfers torque to and from a pitman arm 614. Unlike the configurations shown in FIGS. 1-5, in which most of the components are coaxial, the recirculating ball mechanism 620 has a dual-bore configuration.

An input shaft 624 is operatively connected to the steering wheel or another input member and is carried within a housing 625, which may be formed in multiple pieces and may include separate compartments. Portions of the housing 625 have either been removed or cross-sectioned to better illustrate the workings of the recirculating ball mechanism 620.

The input shaft 624 has a first ball screw 626 formed on one end. The first ball screw 626 shown is formed as an integral, one-piece member with the input shaft 624, but may also be separately formed and rigidly attached. The housing 625 may be formed in more than one piece and may include various seals and bearings to facilitate movement of the components of the recirculating ball mechanism 620.

A first ball nut 628 circumscribes the first ball screw 626 and is in torque-transfer communication with the first ball screw 626 through a first plurality of ball bearings 627, shown schematically, which circulate between the first ball screw 626 and the first ball nut 628. The first ball screw 626 may be referred to as the primary ball screw or the manual ball screw (when the steering wheel is the input member).

Rotation of the steering wheel causes the input shaft 624 and the first ball screw 626 to rotate. As the first ball screw 626 rotates, the rotation is transferred to the first ball nut 628 and causes linear movement (generally left and right, as viewed in FIG. 6) of the first ball nut 628.

The first ball nut 628 has a first rack 630 formed on one side thereof. The first rack 630 engages a sector gear 632 for torque transfer therewith. The first rack 630 meshes with a first plurality of sector teeth 633 on the sector gear 632.

The sector gear 632 is rigidly attached, such as through a splined connection, to the pitman arm 614. Therefore, linear movement of the first ball nut 628 causes rotation of the sector gear 632, such that movement of the steering wheel results in movement of the sector gear 632 and the pitman arm 614. The housing 625 and the sector gear 632 substantially prevent rotation of the first ball nut 628, such that it may translate but may not rotate.

The recirculating ball mechanism 620 may include one or more sensors 634 configured to determine torque and angular orientation at the input shaft 624 or the first ball screw 626. The sensors 634 monitor the torque and displacement of the input shaft 624 communicated from the operator inputs to the steering wheel, and also monitor the reactive torque transferred back to the input shaft 624 by the vehicle wheels. The sensors 634 may include multiple sensors of different types and may be in communication with a control system (not shown) to process signals or commands from the sensors 634. Furthermore, in rear-wheel steering or drive-by-wire configurations, the sensors 634 may directly monitor the steering wheel, which may not be mechanically linked to the input shaft 624.

The electric motor 622 is configured to selectively supply torque to the sector gear 632 through the recirculating ball mechanism 620. The amount of torque delivered by the electric motor 622 may be based, in part, upon the signals from the sensors 634, the control system, or other components and sensors.

A drive unit 636 enables torque transfer between the electric motor 622 and the sector gear 632. Portions of the drive unit 636 may have been cross-sectioned or removed to better illustrate the workings of the drive unit 636. In the configuration shown in FIG. 6, the drive unit 636 includes a chain or a belt 638.

The recirculating ball mechanism 620 further includes a second ball screw 640 and a second ball nut 642. The second ball nut 642 circumscribes the second ball screw 640 and is in torque-transfer communication with the second ball screw 640 through a second plurality of ball bearings (hidden from view by the second ball nut 642), which circulate between the second ball screw 640 and the second ball nut 642. The second ball screw 640 may be referred to as the secondary ball screw or the assist ball screw.

The second ball screw 640 and the second ball nut 642 are not coaxial with the first ball screw 626 and the first ball nut 628. In the configuration shown, the second ball screw 640 is on the opposing side of the sector gear 632 from the first ball screw 626, but is generally planar with the first ball screw 626. However, depending upon the sector gear 632, the first ball screw 626 and the second ball screw 640 may not be planar or the second ball screw 640 may be located above or below (into or out of the view of FIG. 6) the first ball screw 626.

In the configuration shown in FIG. 6, the drive unit 636 and the belt 638 are directly connected to, and act on, the second ball nut 642 through a gear or flange attached thereto. The connections between the drive unit 636 and the second ball nut 642 are shown schematically. The second ball nut 642 transfers torque from the electric motor 622 to the second ball screw 640, which is rigidly attached to a second rack 644. Unlike the first rack 630 and the first ball nut 628, the second rack 644 is formed separately from the second ball nut 642. Instead the second rack 644 moves in unison with the second ball screw 640.

The second rack 644 is engaged with a second plurality of second sector teeth 645. The sector gear 632 is therefore configured to receive torque from both the first rack 630 and the second rack 644. The first and second pluralities of sector teeth 633 and 645 are shown in FIG. 6 as separate groups, but may actually be formed substantially continuously around the sector gear 632.

The second ball screw 640 shown in FIG. 6 slides as the second ball nut 642 rotates under power from the electric motor 622. The second ball nut 642 rotates, but does not translate. The recirculating ball mechanism 620 combines torque from the electric motor 622 through the second ball nut 642 and the second ball screw 640 (the assist ball screw) and from the input shaft 624 through the first ball screw 626 (the primary ball screw).

The combined torque is transferred through the first rack 630 and the second rack 644 to both sides of the sector gear 632 and is delivered to the pitman arm 614. Therefore, the electric motor 622 boosts the torque and power delivered to the pitman arm 614 and the vehicle wheels. The second ball screw 640 may have a different lead angle than the first ball screw 626. Therefore, there may be different levels of torque multiplication between the second ball nut 642 and the second ball screw 640 than between the first ball nut 628 and the first ball screw 626.

Figure 7:
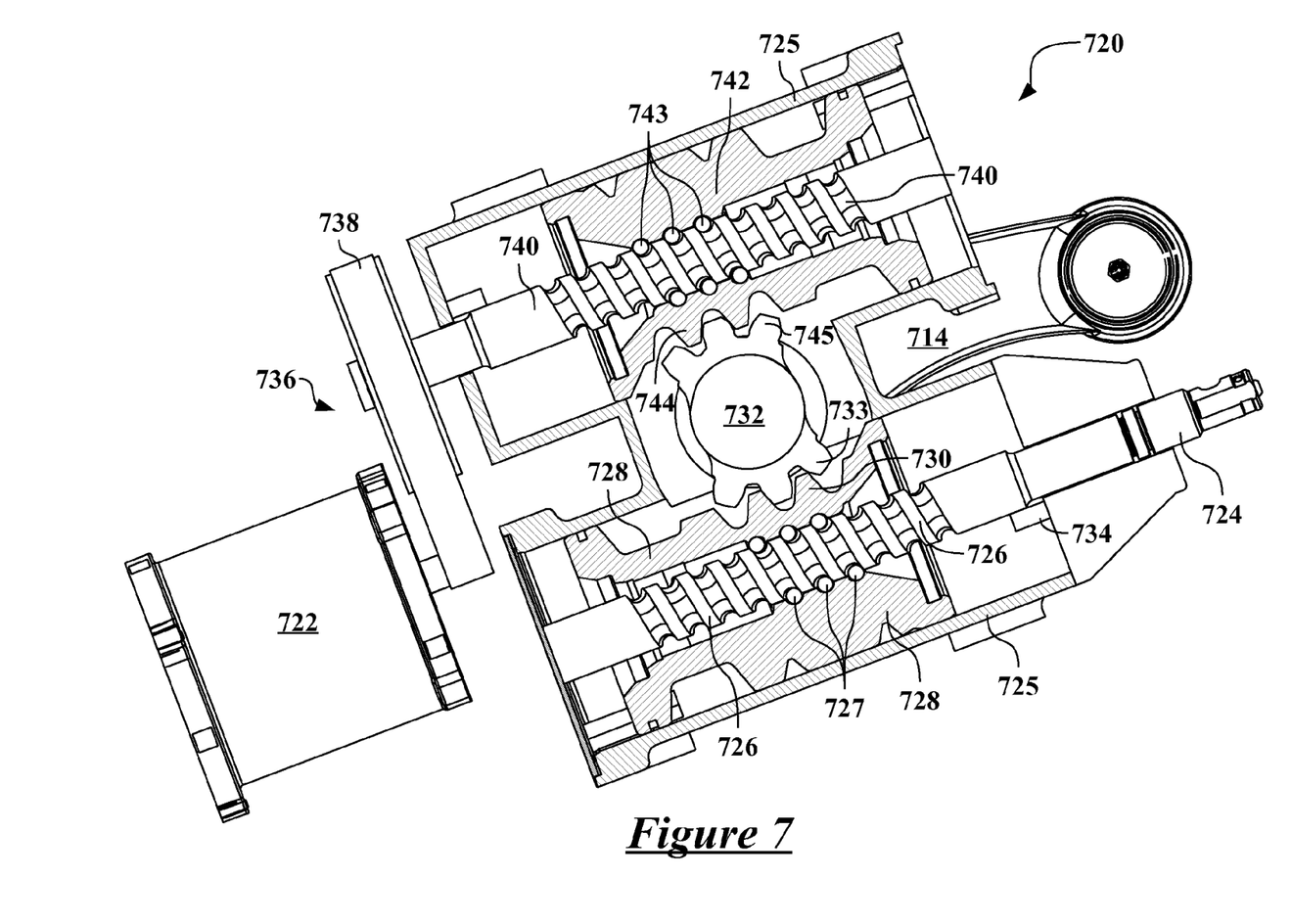
FIG. 7 is a schematic, partial cross-sectional, top view of a recirculating ball mechanism usable with power steering systems, such as the system in FIG. 1, showing another dual-bore recirculating ball mechanism.

Referring now to FIG. 7, and with continued reference to FIGS. 1-6, there is shown a recirculating ball mechanism 720 usable with power steering systems, including the steering system 10 shown in FIG. 1 and other steering systems. FIG. 7 generally shows a top view of the recirculating ball mechanism 720. Features and components shown in other figures may be incorporated and used with those shown in FIG. 7.

The recirculating ball mechanism 720 combines torque from a steering wheel (not shown) or another input member with torque from an electric motor 722 and transfers torque to and from a pitman arm 714. The recirculating ball mechanism 720 has a dual-bore configuration.

An input shaft 724 is operatively connected to the steering wheel or to another input member and is carried within a housing 725, which may be formed in multiple pieces and may include separate compartments. Portions of the housing 725 have either been removed or cross-sectioned to better illustrate the workings of the recirculating ball mechanism 720.

The input shaft 724 has a first ball screw 726 formed on one end thereof. The first ball screw 726 shown is formed as an integral, one-piece member with the input shaft 724, but may also be separately formed and rigidly attached. The housing 725 may be formed in more than one piece and may include various seals and bearings to facilitate movement of the components of the recirculating ball mechanism 720.

A first ball nut 728 circumscribes the first ball screw 726 and is in torque-transfer communication with the first ball screw 726 through a first plurality of ball bearings 727, shown schematically, which circulate between the first ball screw 726 and the first ball nut 728. The first ball screw 726 may be referred to as the primary ball screw or the manual ball screw (when the steering wheel is the input member).

Rotation of the input shaft 724 causes the first ball screw 726 to rotate. As the first ball screw 726 rotates, the rotation is transferred to the first ball nut 728 and causes linear movement (generally left and right, as viewed in FIG. 7) of the first ball nut 728. The first ball nut 728 has a first rack 730 formed on one side thereof. The first rack 730 engages a sector gear 732 for torque transfer therewith. The first rack 730 meshes with a first plurality of sector teeth 733 on the sector gear 732.

The sector gear 732 is rigidly attached, such as through a splined connection, to the pitman arm 714. Therefore, linear movement of the first ball nut 728 causes rotation of the sector gear 732, such that movement of the steering wheel results in movement of the sector gear 732 and the pitman arm 714. The housing 725 and the sector gear 732 substantially prevent rotation of the first ball nut 728, such that it may translate but may not rotate.

The recirculating ball mechanism 720 may include one or more sensors 734 configured to determine torque and angular orientation at the input shaft 724 or the first ball screw 726. The sensors 734 monitor the torque and displacement of the input shaft 724 communicated from the operator inputs to the steering wheel, and also monitor the reactive torque transferred back to the input shaft 724 by the vehicle wheels. The sensors 734 may include multiple sensors of different types and may be in communication with a control system (not shown) to process signals or commands from the sensors 734. Furthermore, in rear-wheel steering or drive-by-wire configurations, the sensors 734 may directly monitor the steering wheel, which may not be mechanically linked to the input shaft 724.

The electric motor 722 is configured to selectively supply torque to the sector gear 732 through the recirculating ball mechanism 720. The amount of torque delivered by the electric motor 722 may be based, in part, upon the signals from the sensors 734, the control system, or other components and sensors.

A drive unit 736 enables torque transfer between the electric motor 722 and the sector gear 732. Portions of the drive unit 736 may have been cross-sectioned or removed to better illustrate the workings of the drive unit 736. In the configuration shown in FIG. 7, the drive unit 736 includes a chain or a belt 738.

The recirculating ball mechanism 720 further includes a second ball screw 740 and a second ball nut 742. The second ball nut 742 circumscribes the second ball screw 740 and is in torque-transfer communication with the second ball screw 740 through a second plurality of ball bearings 743, which circulate between the second ball screw 740 and the second ball nut 742. The second ball screw 740 may be referred to as the secondary ball screw or the assist ball screw.

The second ball screw 740 and the second ball nut 742 are not coaxial with the first ball screw 726 and the first ball nut 728. In the configuration shown, the second ball screw 740 is on the opposing side of the sector gear 732 from the first ball screw 726, but is generally planar with the first ball screw 726. However, depending upon the sector gear 732, the first ball screw 726 and the second ball screw 740 may not be planar, or the second ball screw 740 may be located above or below (into or out of the view of FIG. 7) the first ball screw 726.

In the configuration shown in FIG. 7, the drive unit 736 and the belt 738 are directly connected to, and act on, the second ball screw 740 through a gear or flange attached thereto. The connections between the drive unit 736 and the second ball screw 740 are shown schematically. The second ball screw 740 transfers torque from the electric motor 722 to the second ball nut 742, which is attached to a second rack 744. In the configuration shown, the second rack 744 is formed on the exterior of the second ball nut 742, such that the second rack 744 and the second ball nut 742 move in unison.

The second rack 744 is engaged with a second plurality of second sector teeth 745. The sector gear 732 is therefore configured to receive torque from both the first rack 730 and the second rack 744. The first and second pluralities of sector teeth 733 and 745 are shown in FIG. 7 as separate groups, but may be formed substantially continuously around the sector gear 732.

The second ball screw 740 shown in FIG. 7 rotates under power from the electric motor 722 and causes the second ball nut 742 to slide linearly. The second ball screw 740 rotates, but does not translate within the housing 725. The recirculating ball mechanism 720 combines torque from the electric motor 722 through the second ball screw 740 (the assist ball screw) and from the input shaft 724 through the first ball screw 726 (the primary ball screw).

The combined torque is transferred through the first rack 730 and the second rack 744 to both sides of the sector gear 732 and is delivered to the pitman arm 714. Therefore, the electric motor 722 boosts or assists the torque and power delivered to the pitman arm 714 and the vehicle wheels. The second ball screw 740 may have a different lead angle than the first ball screw 726. Therefore, there may be different levels of torque multiplication between the second ball nut 742 and the second ball screw 740 than between the first ball nut 728 and the first ball screw 726.

Figure 8A:
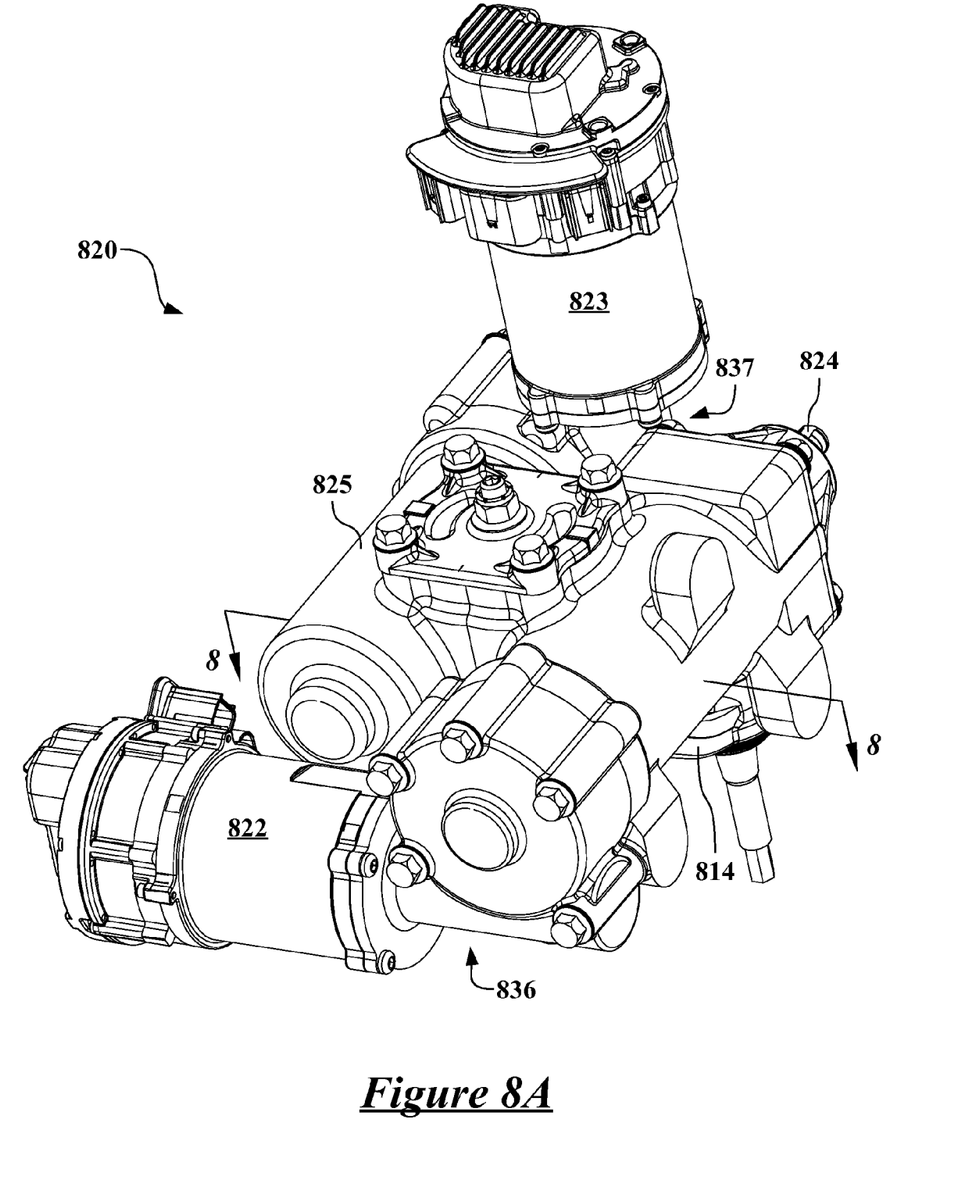
FIG. 8A is a schematic, isometric view of a recirculating ball mechanism usable with power steering systems, such as the system in FIG. 1, showing a dual-bore recirculating ball mechanism having two electric motors.
Figure 8B:
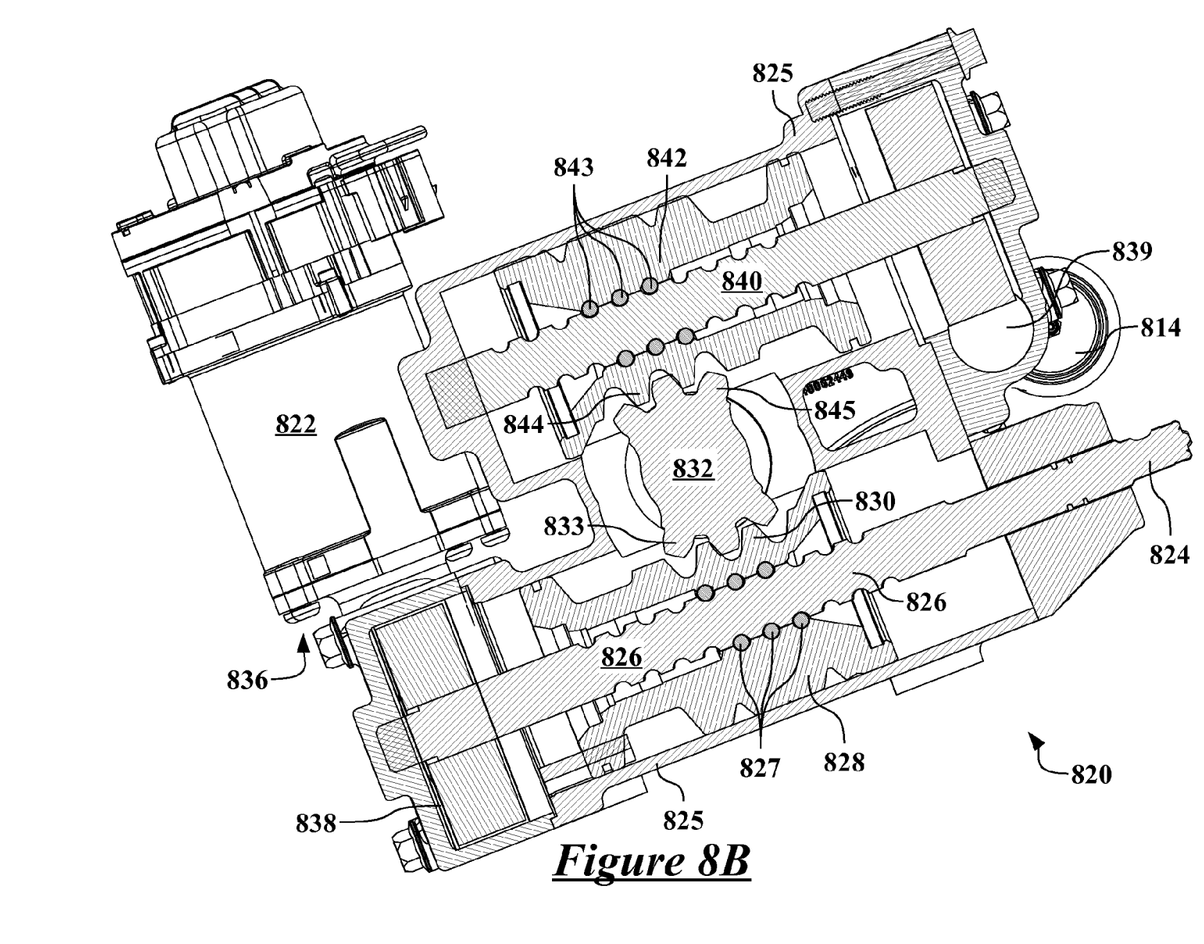
FIG. 8B is a schematic, cross-sectional, top view of the recirculating ball mechanism shown in FIG. 8A, taken along section line 8-8.

Referring now to FIG. 8A and FIG. 8B, and with continued reference to FIGS. 1-7, there are shown two views of a recirculating ball mechanism 820 usable with power steering systems, including the steering system 10 shown in FIG. 1 and other steering systems. FIG. 8A shows an isometric view of the recirculating ball mechanism 820 and FIG. 8B shows a cross-sectional view of the recirculating ball mechanism 820 taken along section line 8-8 of FIG. 8A. Features and components shown in other figures may be incorporated and used with those shown in FIG. 8.

The recirculating ball mechanism 820 combines torque from a steering wheel (not shown) or another input member with torque from a first electric motor 822 and transfers torque to and from a pitman arm 814. The recirculating ball mechanism 820 has a dual-bore configuration, and further includes a second electric motor 823.

An input shaft 824 is operatively connected to the steering wheel or to another input member and is carried within a housing 825, which may be formed in multiple pieces and may include separate compartments. Portions of the housing 825 have either been removed or cross-sectioned in FIG. 8B to better illustrate the workings of the recirculating ball mechanism 820.

The input shaft 824 has a first ball screw 826 formed on one end thereof. The first ball screw 826 shown is formed as an integral, one-piece member with the input shaft 824, but may also be separately formed and rigidly attached. The housing 825 may be formed in more than one piece and may include various seals and bearings to facilitate movement of the components of the recirculating ball mechanism 820.

A first ball nut 828 circumscribes the first ball screw 826 and is in torque-transfer communication with the first ball screw 826 through a first plurality of ball bearings 827, shown schematically, which circulate between the first ball screw 826 and the first ball nut 828. The first ball screw 826 may be referred to as the primary ball screw or the manual ball screw (when the steering wheel is the input member).

Rotation of the input shaft 824 causes the first ball screw 826 to rotate. As the first ball screw 826 rotates, the rotation is transferred to the first ball nut 828 and causes linear movement (generally left and right, as viewed in FIG. 8B) of the first ball nut 828. The first ball nut 828 has a first rack 830 formed on one side thereof. The first rack 830 engages a sector gear 832 for torque transfer therewith. The first rack 830 meshes with a first plurality of sector teeth 833 on the sector gear 832.

The sector gear 832 is rigidly attached, such as through a splined connection, to the pitman arm 814. Therefore, linear movement of the first ball nut 828 causes rotation of the sector gear 832, such that movement of the steering wheel results in movement of the sector gear 832 and the pitman arm 814. The housing 825 and the sector gear 832 substantially prevent rotation of the first ball nut 828, such that it may translate but may not rotate.

The recirculating ball mechanism 820 may include one or more sensors (not shown) configured to determine torque and angular orientation at the input shaft 824 or the first ball screw 826. The sensors monitor the torque and displacement of the input shaft 824 communicated from the operator inputs to the steering wheel, and also monitor the reactive torque transferred back to the input shaft 824 by the vehicle wheels. The sensors may include multiple sensors of different types and may be in communication with a control system (not shown) to process signals or commands from the sensors. Furthermore, in rear-wheel steering or drive-by-wire configurations, the sensors may directly monitor the steering wheel, which may not be mechanically linked to the input shaft 824.

The first electric motor 822 is configured to selectively supply torque to the sector gear 832 through the recirculating ball mechanism 820. The amount of torque delivered by the first electric motor 822 may be based, in part, upon the signals from the sensors, the control system, or other components and sensors.

A first drive unit 836 enables torque transfer between the first electric motor 822 and the sector gear 832. Portions of the first drive unit 836 have been cross-sectioned or removed to better illustrate the workings of the first drive unit 836. In the configuration shown in FIGS. 8A and 8B, the first drive unit 836 includes a first worm gear 838 (largely hidden from view).

In the configuration shown in FIGS. 8A and 8B, the first drive unit 836 and the first worm gear 838 are directly connected to, and act on, the first ball screw 826 through a gear or flange attached thereto. The connections between the first drive unit 836 and the first ball screw 826 are shown schematically. The first ball screw 826 transfers torque from the first electric motor 822 to the first ball nut 828, which is attached to the first rack 830.

The recirculating ball mechanism 820 further includes a second ball screw 840 and a second ball nut 842. The second ball nut 842 circumscribes the second ball screw 840 and is in torque-transfer communication with the second ball screw 840 through a second plurality of ball bearings 843, which circulate between the second ball screw 840 and the second ball nut 842. The second ball screw 840 may be referred to as the secondary ball screw or the assist ball screw, because it is not in direct communication with the input member (the steering wheel) through the input shaft 824.

The second ball screw 840 and the second ball nut 842 are not coaxial with the first ball screw 826 and the first ball nut 828. In the configuration shown, the second ball screw 840 is on the opposing side of the sector gear 832 from the first ball screw 826, but is generally planar with the first ball screw 826. However, depending upon the sector gear 832, the first ball screw 826 and the second ball screw 840 may not be planar, or the second ball screw 840 may be located above or below (as viewed in FIG. 8A, or into or out of the view of FIG. 8B) the first ball screw 826.

A second drive unit 837 enables torque transfer between the second electric motor 823 and the sector gear 832. Portions of the second drive unit 837 have been cross-sectioned or removed to better illustrate the workings of the second drive unit 837. In the configuration shown in FIGS. 8A and 8B, the second drive unit 837 includes a second worm gear 839.

In the configuration shown in FIGS. 8A and 8B, the second drive unit 837 and the second worm gear 839 are directly connected to, and act on, the second ball screw 840 through a gear or flange attached thereto. The connections between the second drive unit 837 and the second ball screw 840 are shown only schematically. The second ball screw 840 transfers torque from the second electric motor 823 to the second ball nut 842, which is attached to a second rack 844. In the configuration shown, the second rack 844 is formed on the exterior of the second ball nut 842, such that the second rack 844 and the second ball nut 842 move in unison.

The second rack 844 is engaged with a second plurality of second sector teeth 845. The sector gear 832 is therefore configured to receive torque from both the first rack 830 and the second rack 844. The first and second pluralities of sector teeth 833 and 845 are shown in FIG. 8 as separate groups, but may be formed substantially continuously around the sector gear 832.

The second ball screw 840 shown in FIG. 8 rotates under power from the second electric motor 823 and causes the second ball nut 842 to slide linearly. The second ball screw 840 rotates, but does not translate within the housing 825. The recirculating ball mechanism 820 combines torque from the second electric motor 823 through the second ball screw 840, from the first electric motor 822 through the first ball screw 826, and from the input shaft 824 through the first ball screw 826.

The combined torque of all three sources is transferred through the first rack 830 and the second rack 844 to both sides of the sector gear 832 and is delivered to the pitman arm 814. Therefore, the first electric motor 822 and the second electric motor 823 both boost or assist the torque and power delivered to the pitman arm 814 and the vehicle wheels. The second ball screw 840 may have a different lead angle than the first ball screw 826. Therefore, there may be different levels of torque multiplication between the second ball nut 842 and the second ball screw 840 than between the first ball nut 828 and the first ball screw 826, and also different levels of boost applied by the second electric motor 823 and the first electric motor 822.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A power steering system for transferring torque between an input member and a pitman arm, comprising:
   an input shaft operatively connected to the input member;
   a sector gear operatively connected to the pitman arm for torque transfer therewith;
   a first ball screw, wherein the first ball screw is formed on the input shaft;
   a first ball nut circumscribing the first ball screw and in torque-transfer communication with the first ball screw through a plurality of ball bearings;
   a first rack rigidly attached to the first ball nut, wherein the first rack is meshed with the sector gear for torque transfer therewith;
   a second ball screw, wherein the second ball screw is not substantially coaxial with the first ball screw;
   a second ball nut circumscribing the second ball screw and in torque-transfer communication with the second ball screw through the plurality of ball bearings;
   a second rack meshed with the sector gear for torque transfer therewith; and
   an electric motor configured to selectively supply torque to the sector gear through the second ball screw.

2. The steering system of claim 1, further comprising:
   a drive unit disposed between the electric motor and the first ball nut.

3. The steering system of claim 2, wherein the second rack is rigidly attached to the second ball screw.

4. The steering system of claim 3, wherein the drive unit is directly connected to, and acts on, the second ball nut.

5. The steering system of claim 4, further comprising:
   a sensor configured to determine torque at the input shaft.

6. The steering system of claim 2, wherein the second rack is rigidly attached to the second ball nut.

7. The steering system of claim 6, wherein the drive unit is directly connected to, and acts on, the second ball screw.

8. The steering system of claim 7, further comprising:
   a sensor configured to determine torque at the input shaft.

9. The steering system of claim 8, wherein the input member is a steering wheel, such that the input shaft is in communication with the steering wheel.

10. A power steering system for transferring torque to a pitman arm, comprising:
    a sector gear operatively connected to the pitman arm for torque transfer therewith;
    a first ball screw;
    a first ball nut circumscribing the first ball screw and in torque-transfer communication with the first ball screw through a plurality of ball bearings;
    a first rack rigidly attached to the first ball nut, wherein the first rack is meshed with the sector gear for torque transfer therewith;
    a second ball screw, wherein the second ball screw is not substantially coaxial with the first ball screw;
    a second ball nut circumscribing the second ball screw and in torque-transfer communication with the second ball screw through the plurality of ball bearings;
    a second rack meshed with the sector gear for torque transfer therewith; and
    an electric motor configured to selectively supply torque to the sector gear through the second ball screw.

11. The steering system of claim 10, wherein the second rack is rigidly attached to the second ball nut.

12. The steering system of claim 11, wherein the electric motor acts on the second ball screw.

13. The steering system of claim 12, further comprising:
    a drive unit disposed between the electric motor and the first ball nut.

14. The steering system of claim 10, wherein the second rack is rigidly attached to the second ball screw.

15. The steering system of claim 14, wherein the electric motor acts on the second ball nut.

16. The steering system of claim 15, further comprising:
    a drive unit disposed between the electric motor and the first ball nut.

17. A power steering system for transferring torque to a pitman arm, comprising:
    a sector gear operatively connected to the pitman arm for torque transfer therewith;
    a first ball screw;
    a first ball nut circumscribing the first ball screw and in torque-transfer communication with the first ball screw through a plurality of ball bearings;
    a first rack rigidly attached to the first ball nut, wherein the first rack is meshed with the sector gear for torque transfer therewith;
    a second ball screw, wherein the second ball screw is not substantially coaxial with the first ball screw;
    a second ball nut circumscribing the second ball screw and in torque-transfer communication with the second ball screw through the plurality of ball bearings;
    a second rack meshed with the sector gear for torque transfer therewith;
    a first electric motor configured to selectively supply torque to the sector gear; and
    a second electric motor configured to selectively supply torque to the sector gear.

18. The steering system of claim 17,
    wherein the first electric motor acts on the first ball screw; and
    wherein the second electric motor acts on the second ball screw.

* * * * *